United States Patent

Nakata

(10) Patent No.: US 12,525,869 B2
(45) Date of Patent: Jan. 13, 2026

(54) FILTER DEVICE, POWER SUPPLY DEVICE, AND CONTROL DEVICE FOR FILTER CIRCUIT

(71) Applicant: Mitsubishi Electric Corporation, Tokyo (JP)

(72) Inventor: Kazuhiro Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 385 days.

(21) Appl. No.: 18/298,092

(22) Filed: Apr. 10, 2023

(65) Prior Publication Data

US 2023/0396153 A1    Dec. 7, 2023

(30) Foreign Application Priority Data

Jun. 2, 2022  (JP) ................................. 2022-089996

(51) Int. Cl.
| | |
|---|---|
| *H02M 1/14* | (2006.01) |
| *G01R 21/06* | (2006.01) |
| *H02M 1/00* | (2006.01) |

(52) U.S. Cl.
CPC ............. *H02M 1/14* (2013.01); *G01R 21/06* (2013.01); *H02M 1/0009* (2021.05)

(58) Field of Classification Search
CPC ........ H02M 1/14; H02M 1/0009; G01R 21/06
See application file for complete search history.

(56) References Cited

U.S. PATENT DOCUMENTS

| | | | | | |
|---|---|---|---|---|---|
| 4,922,469 | A | * | 5/1990 | Noro ...................... | G10K 11/02 |
| | | | | | 181/175 |
| 7,095,218 | B2 | * | 8/2006 | Kobayashi .......... | H02M 3/1588 |
| | | | | | 323/285 |
| 10,340,689 | B2 | * | 7/2019 | Chan ....................... | H02J 7/342 |
| 10,595,378 | B2 | * | 3/2020 | Li ......................... | H05B 45/385 |
| 11,101,734 | B2 | * | 8/2021 | Lin ....................... | H02M 3/158 |
| 11,606,032 | B2 | * | 3/2023 | Song ................... | H02M 3/1582 |
| 11,705,812 | B2 | * | 7/2023 | Yen ......................... | H02M 1/15 |
| | | | | | 323/282 |
| 2004/0113564 | A1 | * | 6/2004 | Glaser ................. | H05B 41/3925 |
| | | | | | 315/225 |
| 2004/0263284 | A1 | * | 12/2004 | Terakawa ............. | H03H 1/0007 |
| | | | | | 333/185 |

(Continued)

FOREIGN PATENT DOCUMENTS

| | | |
|---|---|---|
| JP | 2007-267537 A | 10/2007 |
| JP | 2008-289252 A | 11/2008 |
| JP | 2014-103842 A | 6/2014 |

*Primary Examiner* — Kyle J Moody
(74) *Attorney, Agent, or Firm* — Sughrue Mion, PLLC

(57) ABSTRACT

A filter device includes a filter circuit having an inductor connected between a DC power supply and a load, and a variable DC resistor connected in parallel to the inductor. The filter device further includes a power calculation circuit to acquire voltage information showing a DC voltage outputted from the filter circuit to the load, and current information showing a direct current outputted from the filter circuit to the load, and to calculate electric power consumption of the load from the voltage information and the current information, and a resistance value control circuit to control the resistance value of the variable DC resistor on the basis of the electric power consumption calculated by the power calculation circuit and the DC voltage.

15 Claims, 13 Drawing Sheets

(56) References Cited

U.S. PATENT DOCUMENTS

| | | | |
|---|---|---|---|
| 2009/0109880 A1* | 4/2009 | Kim | H04B 1/50 |
| | | | 370/278 |
| 2009/0115497 A1 | 5/2009 | Takeyama | |
| 2009/0231051 A1* | 9/2009 | Tokuyama | H03B 5/1215 |
| | | | 331/117 R |
| 2010/0123356 A1* | 5/2010 | Sihler | H02J 3/18 |
| | | | 307/105 |
| 2011/0046699 A1* | 2/2011 | Mazanec | A61N 1/3787 |
| | | | 607/61 |
| 2012/0121004 A1* | 5/2012 | Chang | H03H 7/40 |
| | | | 375/232 |
| 2014/0111176 A1 | 4/2014 | Nishimura | |
| 2016/0190921 A1* | 6/2016 | Kumar | H02M 7/4837 |
| | | | 323/271 |
| 2022/0321007 A1* | 10/2022 | Sato | B60R 16/033 |

* cited by examiner

FILTER DEVICE, POWER SUPPLY DEVICE, AND CONTROL DEVICE FOR FILTER CIRCUIT

TECHNICAL FIELD

The present disclosure relates to a filter device, a power supply device, and a control device for a filter circuit.

BACKGROUND ART

There is a power supply device including a filter circuit (for example, refer to Patent Literature 1). The filter circuit has a booster circuit that raises a voltage supplied from a power supply, and a variable resistor connected between the booster circuit and a load. In order to reduce a ripple which is a phenomenon in which the voltage raised by the booster circuit vibrates, the filter circuit adjusts the resistance value of the variable resistor depending on the voltage raised.

CITATION LIST

Patent Literature

Patent Literature 1: JP 2008-289252 A

SUMMARY OF INVENTION

Technical Problem

A problem with the power supply device disclosed in Patent Literature 1 is that, when the power loss of the filter circuit varies with a variation in the electric power consumption of the load, the power loss of the filter circuit cannot be controlled.

The present disclosure is made in order to solve the above-mentioned problem, and it is therefore an object of the present disclosure to provide a filter device that can reduce the power loss of a filter circuit to $\alpha$ ($0<\alpha<1$) times the electric power consumption of a load or less.

Solution to Problem

A filter device according to the present disclosure includes a filter circuit having an inductor connected between a DC power supply and a load, and a variable DC resistor connected in parallel to the inductor. The filter device further includes: a power calculation circuit to acquire voltage information showing a DC voltage outputted from the filter circuit to the load, and current information showing a direct current outputted from the filter circuit to the load, and to calculate the electric power consumption of the load from the voltage information and the current information; and a resistance value control circuit to control the resistance value of the variable DC resistor on the basis of the electric power consumption calculated by the power calculation circuit and the DC voltage.

Advantageous Effects of Invention

According to the present disclosure, the power loss of the filter circuit can be reduced to $\alpha$ ($0<\alpha<1$) times the electric power consumption of the load or less.

BRIEF DESCRIPTION OF DRAWINGS

FIG. 9 is a schematic diagram showing a rectifier circuit for square-wave pulses for supplying a DC voltage to the gate potential control circuit 15a;

DESCRIPTION OF EMBODIMENTS

Hereinafter, in order to explain the present disclosure in greater detail, embodiments of the present disclosure will be explained with reference to the accompanying drawings.

Embodiment 1

Figure 1:
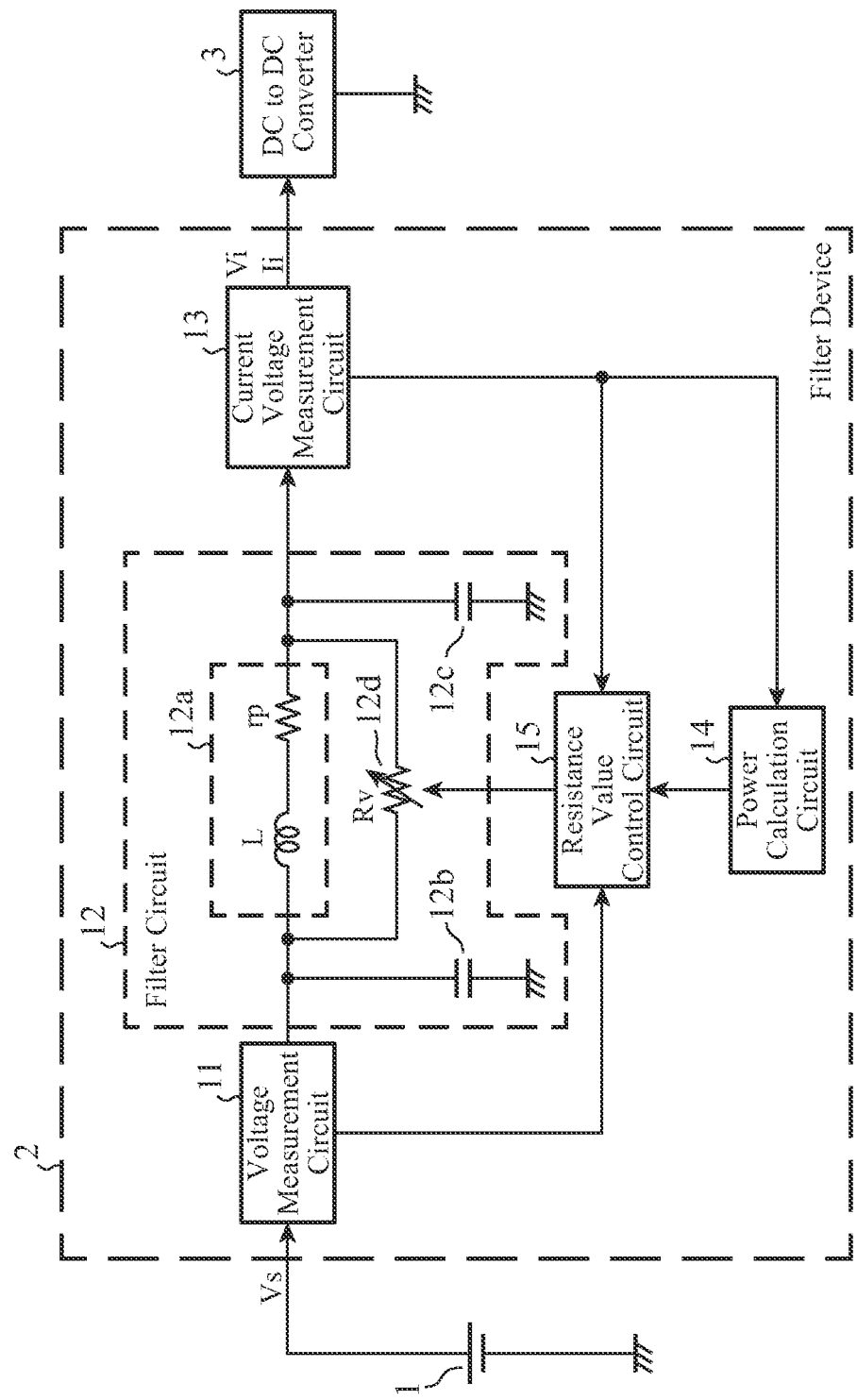
FIG. 1 is a schematic diagram showing a power supply device including a filter device 2 according to Embodiment 1.

FIG. 1 is a schematic diagram showing a power supply device including a filter device 2 according to Embodiment 1.

The power supply device shown in FIG. 1 includes a DC power supply 1 and the filter device 2.

The power supply device supplies power to a DC to DC converter 3 which is a load.

In the power supply device shown in FIG. 1, the load is the DC to DC converter 3. However, this is only an example, and the load may be a constant power load other than the DC to DC converter 3.

The DC power supply 1 outputs a DC voltage Vs, as a power supply voltage, to the filter device 2.

The filter device 2 includes a voltage measurement circuit 11, a filter circuit 12, a current voltage measurement circuit 13, a power calculation circuit 14 and a resistance value control circuit 15. A circuit including the power calculation circuit 14 and the resistance value control circuit 15 is a control device of the filter circuit 12.

The DC to DC converter 3 converts a DC voltage Vi outputted from the filter device 2 into another DC voltage, and outputs the other DC voltage as an output voltage. The DC to DC converter 3 is a constant power load that can maintain the output voltage at a constant value.

The voltage measurement circuit 11 measures the DC voltage Vs which is applied to the filter circuit 12 by the DC power supply 1.

The voltage measurement circuit 11 outputs voltage information showing the DC voltage Vs to the resistance value control circuit 15.

The filter circuit 12 has an inductor 12a, capacitors 12b and 12c, and a variable DC resistor 12d.

One end of the inductor 12a is electrically connected to the DC power supply 1. The other end of the inductor 12a is electrically connected to the DC to DC converter 3.

The inductance value of the inductor 12a is denoted by L, and the inductor 12a includes a parasitic DC resistance rp.

The filter circuit 12 is, for example, a low pass filter for reducing a switching noise generated from a switching element included in the DC to DC converter 3.

The current voltage measurement circuit 13 measures the DC voltage Vi outputted from the filter circuit 12 to the DC to DC converter 3, and a direct current Ii outputted from the filter circuit 12 to the DC to DC converter 3.

The current voltage measurement circuit 13 outputs voltage information showing the DC voltage Vi and current information showing the direct current Ii to each of the following circuits: the power calculation circuit 14 and the resistance value control circuit 15.

The power calculation circuit 14 acquires the voltage information showing the DC voltage Vi and the current information showing the direct current Ii from the current voltage measurement circuit 13.

The power calculation circuit 14 calculates the electric power consumption Pi of the DC to DC converter 3 from the DC voltage Vi and the direct current Ii.

The power calculation circuit 14 outputs the electric power consumption Pi of the DC to DC converter 3 to the resistance value control circuit 15.

The resistance value control circuit 15 controls the resistance value Rv of the variable DC resistor 12d on the basis of the electric power consumption Pi calculated by the power calculation circuit 14 and the DC voltage Vi.

More specifically, the resistance value control circuit 15 acquires power information showing the electric power consumption Pi from the power calculation circuit 14, acquires the voltage information showing the DC voltage Vs from the voltage measurement circuit 11, and acquires each of the following pieces of information: the voltage information showing the DC voltage Vi and the current information showing the direct current Ii from the current voltage measurement circuit 13. The resistance value control circuit 15 then calculates the resistance value Rvα of the variable DC resistor 12d which causes the power loss Ploss of the filter circuit 12 to be equal to or less than α times the electric power consumption Pi, using the electric power consumption Pi, the DC voltage Vs, the DC voltage Vi and the direct current Ii. The resistance value control circuit 15 controls the variable DC resistor 12d to cause the resistance value of the variable DC resistor 12d to be equal to the resistance value Rvα.

Next, the principle of the power supply device shown in FIG. 1 will be explained while disregarding Rv first. Disregarding Rv means that Rv is assumed to be infinite.

The DC to DC converter 3 which is a constant power load that maintains the output voltage at a constant value is connected to the DC power supply 1 via the filter circuit 12.

The inductor 12a includes a parasitic DC resistance rp. On the other hand, the DC to DC converter 3 has a negative resistance. More specifically, when the DC voltage Vi which is the voltage inputted to the DC to DC converter 3 decreases, the direct current Ii which is the input current increases.

The power loss Ploss of the filter circuit 12 is expressed by $rp \times Ii^2$. Therefore, the power loss Ploss of the filter circuit 12 increases with increase in the parasitic DC resistance rp, and increases with decrease in the DC voltage Vi.

The DC voltage Vi which is the input voltage of the DC to DC converter 3 is expressed as shown by the following equation (1).

Further, the electric power consumption Pi of the DC to DC converter 3 is expressed as shown by the following equation (2).

When the equation (1) is substituted into the equation (2), the electric power consumption Pi of the DC to DC converter 3 is expressed as shown by the following equation (3).

$$Vi = Vs - (rp \times Ii) \qquad (1)$$

$$Pi = Vi \times Ii \qquad (2)$$

$$Pi = (Vs - (rp \times Ii)) \times Ii \qquad (3)$$
$$= Vs \times Ii - rp \times Ii^2$$

The equation (3) can be transformed as shown by the following equation (4), and the direct current Ii is expressed as shown by an equation (5).

$$rp \times Ii^2 - Vs \times Ii + Pi = 0 \qquad (4)$$

$$Ii = \frac{Vs - \sqrt{Vs^2 - 4rp \times Pi}}{2rp} \qquad (5)$$

Further, the electric power consumption Pi of the DC to DC converter 3 can be expressed as shown by the following equation (6).

$$Pi = \frac{Vi \times (Vi - Vs)}{rp} = \frac{Vi^2}{rp} - \frac{Vs \times Vi}{rp} \qquad (6)$$

The equation (6) can be transformed as shown by the following equation (7), and the DC voltage Vi is expressed as shown by an equation (8).

$$Vi^2 - Vs \times Vi - rp \times Pi = 0 \qquad (7)$$

$$Vi = \frac{Vs - \sqrt{Vs^2 - 4rp \times Pi}}{2} \qquad (8)$$

When the equation (1) is transformed and solved for the DC voltage Vs, the DC voltage Vs is expressed as shown by the following equation (9).

$$Vs = Vi + rp \times Ii \quad (9)$$
$$= Vi + \frac{rp \times Pi}{Vi}$$

Figure 2:
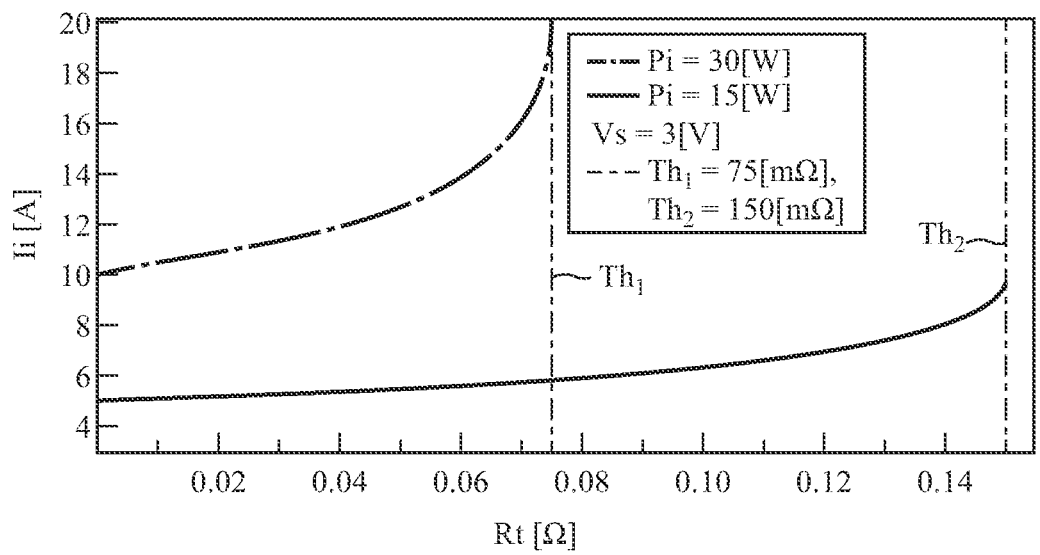
FIG. 2 is an explanatory drawing showing the correspondence between a total DC resistance Rt of a filter circuit 12 and a direct current Ii, the correspondence being calculated using an equation (5)

FIG. 2 is an explanatory drawing showing the correspondence between the total DC resistance Rt of the filter circuit 12 and the direct current Ii, the correspondence being calculated using the equation (5). The value of the total DC resistance Rt is determined by the parasitic DC resistance rp of the inductor 12a and the variable DC resistor 12d.

In FIG. 2, the horizontal axis shows the total DC resistance Rt [Ω], and the vertical axis shows the direct current Ii [A].

An alternate long and short dash line shows a relation between the total DC resistance Rt and the direct current Ii when the electric power consumption Pi is 30 [W].

A solid line shows a relation between the total DC resistance Rt and the direct current Ii when the electric power consumption Pi is 15 [W].

In the example of FIG. 2, the DC voltage Vs is 3 [V].

Figure 3:
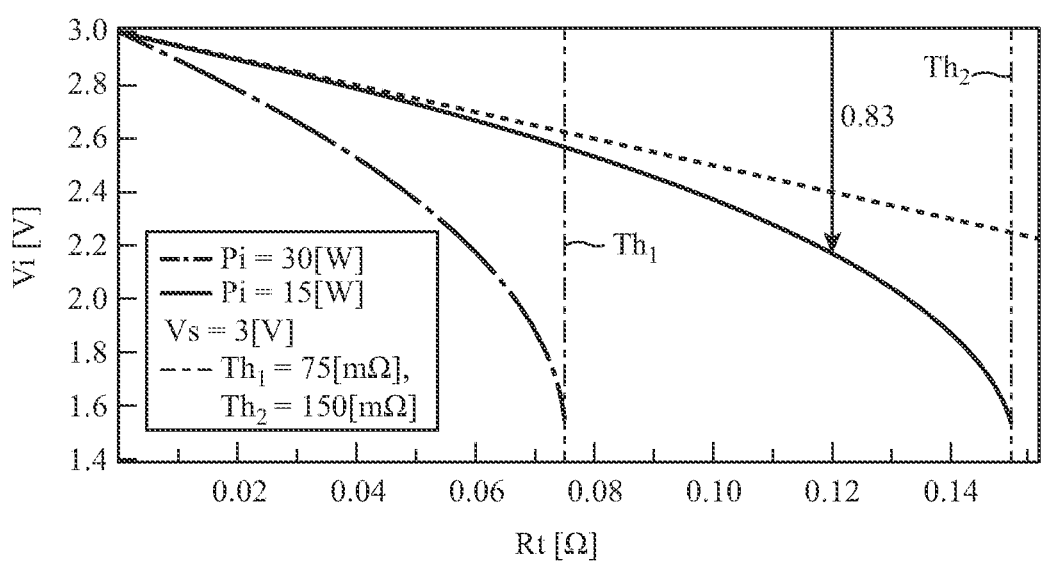
FIG. 3 is an explanatory drawing showing the correspondence between the total DC resistance Rt of the filter circuit 12 and a DC voltage Vi, the correspondence being calculated using an equation (8)

FIG. 3 is an explanatory drawing showing the correspondence between the total DC resistance Rt of the filter circuit 12, and the DC voltage Vi, the correspondence being calculated using the equation (8).

In FIG. 3, the horizontal axis shows the total DC resistance Rt [Ω], and the vertical axis shows the DC voltage Vi [V].

An alternate long and short dash line shows a relation between the total DC resistance Rt and the DC voltage Vi when the electric power consumption Pi is 30 [W].

A solid line shows a relation between the total DC resistance Rt and the DC voltage Vi when the electric power consumption Pi is 15 [W].

In the example of FIG. 3, the DC voltage Vs is 3 [V].

The total DC resistance Rt increases with increase in the parasitic DC resistance rp.

The direct current Ii varies in the form of a quadratic curve with increase in the total DC resistance Rt, as shown in FIG. 2.

Further, the direct current Ii increases rapidly as the total DC resistance Rt approaches a below-mentioned threshold given by Rt_mat with increase in the parasitic DC resistance rp. In the example of FIG. 2, the threshold $Th_1$ when the electric power consumption Pi is 30 [W] is 75 [mΩ], and the threshold $Th_2$ when the electric power consumption Pi is 15 [W] is 150 [mΩ].

The DC voltage Vi varies in the form of a quadratic curve with increase in the total DC resistance Rt, as shown in FIG. 3.

Further, the DC voltage Vi decreases rapidly as the total DC resistance Rt approaches the threshold with increase in the parasitic DC resistance rp. In the example of FIG. 3, the threshold $Th_1$ when the electric power consumption Pi is 30 [W] is 75 [mΩ], and the threshold $Th_2$ when the electric power consumption Pi is 15 [W] is 150 [mΩ].

When the direct current Ii increases rapidly and the DC voltage drop in the filter circuit 12 increases with decrease in the DC voltage Vs of the power supply, the DC voltage Vi decreases rapidly and, as a result, it may be impossible to supply desired power to the DC to DC converter 3.

For example, if the DC voltage Vs is 3 [V] and the parasitic DC resistance rp included in the inductor 12a is 0 [Ω] when the electric power consumption Pi is 15 [W], the direct current Ii is 5 [A].

In the case where the parasitic DC resistance rp included in the inductor 12a is, for example, 0.12[Ω], and the direct current Ii flowing through the inductor 12a is assumed to be 5 [A] which is the same as the above-mentioned direct current, the voltage drop in the inductor 12a is expected to be of the order of 0.6 [V] (=5 [A]×0.12 [Ω]) but the actual voltage drop is approximately 0.83 [V] because the direct current Ii flowing through the inductor 12a increases to approximate 7 A, as shown in FIG. 3.

The power loss Ploss of the inductor 12a when the voltage drop in the inductor 12a is assumed to be 0.6 [V] is 3 [W] (=$0.6^2$/0.12).

On the other hand, the power loss Ploss which actually occurs is 5.7 [W] (=$0.83^2$/0.12) when the voltage drop in the inductor 12a is 0.83 [V].

Therefore, the power loss Ploss which actually occurs is 1.9 times the power loss Ploss when the voltage drop in the inductor 12a is assumed to be 0.6 [V]. As a result, this may cause a burnout accident in the inductor 12a.

As a phenomenon in which the DC voltage Vs decreases extremely compared with the voltage under normal conditions, there is a battery voltage drop in vehicle-mounted equipment at a time of cranking a vehicle, for example.

If the electric power consumption Pi of the DC to DC converter 3 is 30 [W], the power supply device shown in FIG. 1 cannot supply the desired power to the DC to DC converter 3 when the total DC resistance Rt is equal to or greater than the threshold $Th_1$.

Further, if the electric power consumption Pi of the DC to DC converter 3 is 15 [W], the power supply device shown in FIG. 1 cannot supply the desired power to the DC to DC converter 3 when the total DC resistance Rt is equal to or greater than the threshold $Th_2$.

The DC resistance value when the total DC resistance Rt of the filter circuit 12 approaches the threshold $Th_1$ or $Th_2$ is the one in a load matching state. More specifically, the DC resistance value when the total DC resistance Rt approaches the threshold $Th_1$ or $Th_2$ is equal to the input DC resistance value of the DC to DC converter 3, and the input DC voltage of the DC to DC converter 3 is Vs/2.

When the resistance value of the total DC resistance Rt at this time is denoted by Rt_mat [Ω], and the inside of the root included in the equation (5) or (8) is set to zero, Rt_mat [Ω] is expressed as shown by the following equation (10). This is a load matching condition which is generally known well, and means that when there is a match between the total DC resistance value on the supply side and the DC resistance value of the load, the maximum power Pmax which can be supplied to the load is given by $Vs^2$/4Rt_mat.

$$Rt\_mat = \frac{Vs^2}{4Pi} \quad (10)$$

When the resistance value of the total DC resistance Rt which causes the power loss Ploss of the filter circuit 12 to be equal to α (0<α<1) times the electric power consumption Pi of the DC to DC converter 3 is denoted by Rc, the following equation (11) holds.

$$Ploss = \alpha \times Pi \quad (11)$$

-continued $$= Rc \times Ii^2$$

$$= Rc \times \left(\frac{Vs - \sqrt{Vs^2 - 4Rt \times Pi}}{2Rt}\right)^2$$

When the equation (11) is solved for the DC resistance value Rc of the total DC resistance Rt, assuming that each of the following: the DC voltage Vs and the electric power consumption Pi is known, the DC resistance value Rc is expressed as shown by the following equation (12).

$$Rc = \frac{\alpha \times Vs^2}{Pi \times (1+\alpha)^2} \quad (12)$$

$$= \frac{\alpha \times \left(Vi + \frac{Rt \times Pi}{Vi}\right)^2}{Pi \times (1+\alpha)^2}$$

When the resistance value of the total DC resistance Rt is Rc, the power loss Ploss of the filter circuit 12 is α times the electric power consumption Pi of the DC to DC converter 3.

Further, the DC resistance value Rc of the parasitic DC resistance rp is expressed as shown by the following equation (13). Rc is a threshold for causing Ploss of the filter circuit 12 to be α times Pi.

$$Rc = \frac{\alpha \times Vs^2}{Pi \times (1+\alpha)^2} \quad (13)$$

$$= \frac{\alpha \times Vs^2}{Pi \times (1 + 2\alpha + \alpha^2)}$$

$$= \frac{Vs^2}{Pi \times \left(\frac{1}{\alpha} + 2 + \alpha\right)}$$

$$\leq \frac{Vs^2}{4Pi}$$

$$\because = \frac{1}{\alpha} + \alpha \geq 2\sqrt{\frac{1}{\alpha} \times \alpha} = 2 \quad (14)$$

Therefore, the maximum of the DC resistance value Rc is $Vs^2/4Pi$ regardless of the value of α, and matches the equation (10).

Figure 4:
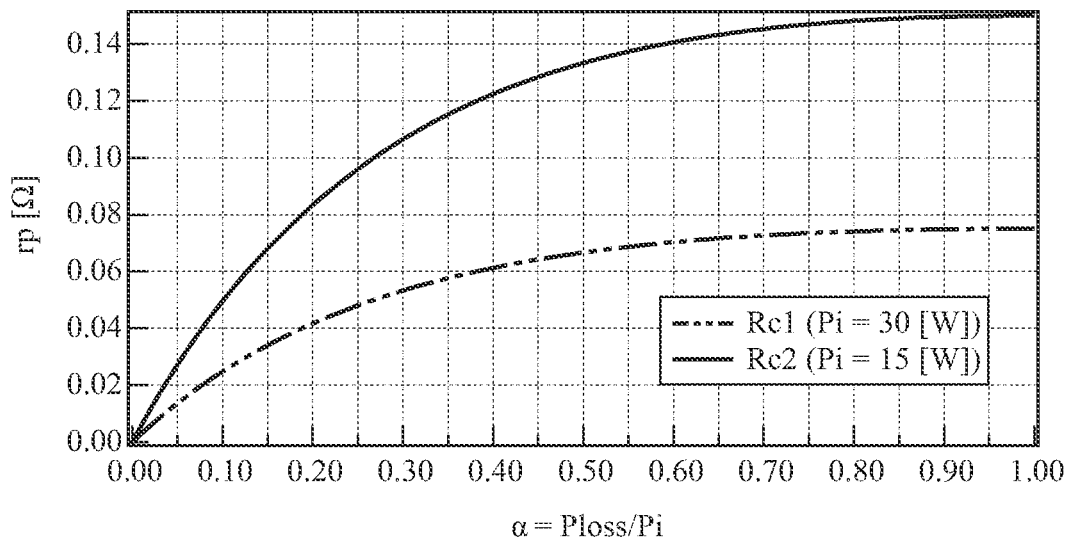
FIG. 4 is an explanatory drawing showing the correspondence between $\alpha$ and a parasitic DC resistance rp of an inductor.

FIG. 4 is an explanatory drawing showing the correspondence between α and a DC resistance value Rc.

In FIG. 4, the horizontal axis shows α (=Ploss/Pi), and the vertical axis shows the parasitic DC resistance rp [Ω].

An alternate long and two short dashes line shows a relation between α and the DC resistance value Rc when the electric power consumption Pi is 30 [W].

A solid line shows a relation between α and the DC resistance value Rc when the electric power consumption Pi is 15 [W].

Next, the operation of the power supply device shown in FIG. 1 will be explained.

When the practical use of the power supply device shown in FIG. 1 is started, the voltage measurement circuit 11 measures the DC voltage Vs which is applied to the filter circuit 12 by the DC power supply 1.

The voltage measurement circuit 11 outputs the voltage information showing the DC voltage Vs to the resistance value control circuit 15.

The current voltage measurement circuit 13 measures the DC voltage Vi outputted from the filter circuit 12 to the DC to DC converter 3, and measures the direct current Ii outputted from the filter circuit 12 to the DC to DC converter 3.

The current voltage measurement circuit 13 outputs the voltage information showing the DC voltage Vi and the current information showing the direct current Ii to each of the following circuits: the power calculation circuit 14 and the resistance value control circuit 15.

The power calculation circuit 14 acquires the voltage information showing the DC voltage Vi and the current information showing the direct current Ii from the current voltage measurement circuit 13.

The power calculation circuit 14 calculates the electric power consumption Pi of the DC to DC converter 3 by substituting each of the following: the DC voltage Vi and the direct current Ii into the equation (2).

The power calculation circuit 14 outputs the power information showing the electric power consumption Pi of the DC to DC converter 3 to the resistance value control circuit 15.

The resistance value control circuit 15 acquires the voltage information showing the DC voltage Vs from the voltage measurement circuit 11, and acquires the power information showing the electric power consumption Pi from the power calculation circuit 14.

The resistance value control circuit 15 calculates the DC resistance value Rc which is the DC resistance value of the filter circuit 12 which causes the power loss Ploss of the filter circuit 12 to be equal to α times the electric power consumption Pi, by substituting each of the following: the DC voltage Vs and the electric power consumption Pi into the equation (12).

The resistance value control circuit 15 also acquires the voltage information showing the DC voltage Vi and the current information showing the direct current Ii from the current voltage measurement circuit 13.

The resistance value control circuit 15 calculates the total DC resistance Rt of the filter circuit 12 using the DC voltage Vs, the DC voltage Vi and the direct current Ii, as shown in the following equation (15).

$$Rt = \frac{Vs - Vi}{Ii} \quad (15)$$

Because the total DC resistance Rt may be calculated from the parallel connection of rp and Rv, Rt may be calculated from the value of rp stored in a not-illustrated memory, and the value of Rv read from a table showing the correspondence between an on resistance Rv between a drain and a source and a voltage Vgs in a below-mentioned transistor, and, in this case, it is not necessary to acquire the voltage information showing the DC voltage Vs from the voltage measurement circuit 11, and to calculate Rt using the equation (15).

The resistance value control circuit 15 compares the total DC resistance Rt of the parasitic DC resistance rp and the resistance value Rv of the variable DC resistor 12*d* with the DC resistance value Rc, and, when the total DC resistance Rt is larger than the DC resistance value Rc, determines that the power loss Ploss of the filter circuit 12 is larger than α times the electric power consumption Pi.

In order to cause the power loss Ploss of the filter circuit 12 to be smaller than α times the electric power consumption Pi, the resistance value control circuit 15 controls the resistance value of the variable DC resistor 12*d* to cause the resistance value to be equal to or less than Rv expressed by the following equations (16). Rv expressed by the equation (16) is an upper limit of the resistance value of the variable DC resistor 12*d* which causes the power loss Ploss of the filter circuit 12 to be equal to or less than α times the electric power consumption Pi.

$$Rv = \frac{rp \times Rc}{rp - Rc} \quad (16)$$

Embodiment

Figure 5:
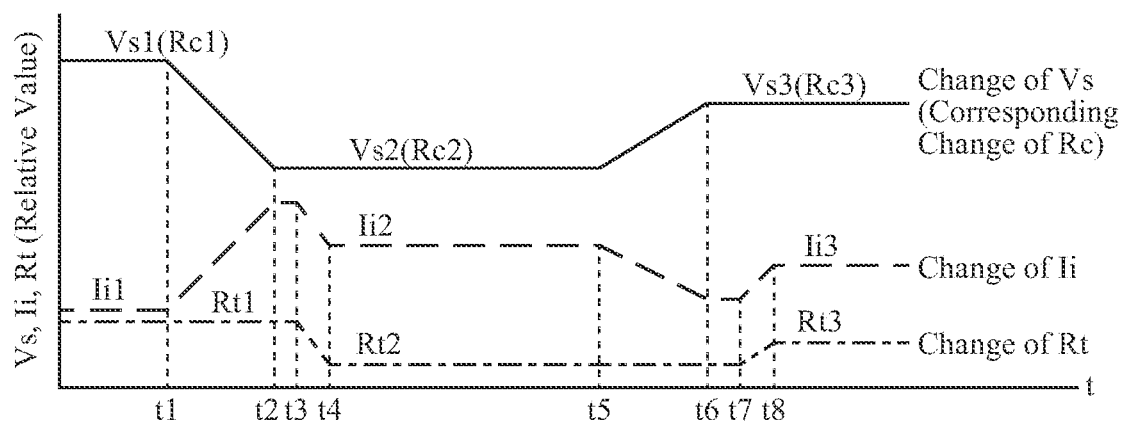
FIG. 5 is an explanatory drawing showing an example of a temporal change of each of the following: a DC voltage Vs, the direct current Ii and the total DC resistance Rt.

FIG. 5 is an explanatory drawing showing an example of a temporal change of each of the following: the DC voltage Vs, the direct current Ii and the total DC resistance Rt.

In FIG. 5, the horizontal axis shows a time, and the vertical axis shows each of the following: the DC voltage Vs, the direct current Ii and the total DC resistance Rt. Each of the following: the DC voltage Vs, the direct current Ii and the total DC resistance Rt in the vertical axis is a relative value.

Figure 6:
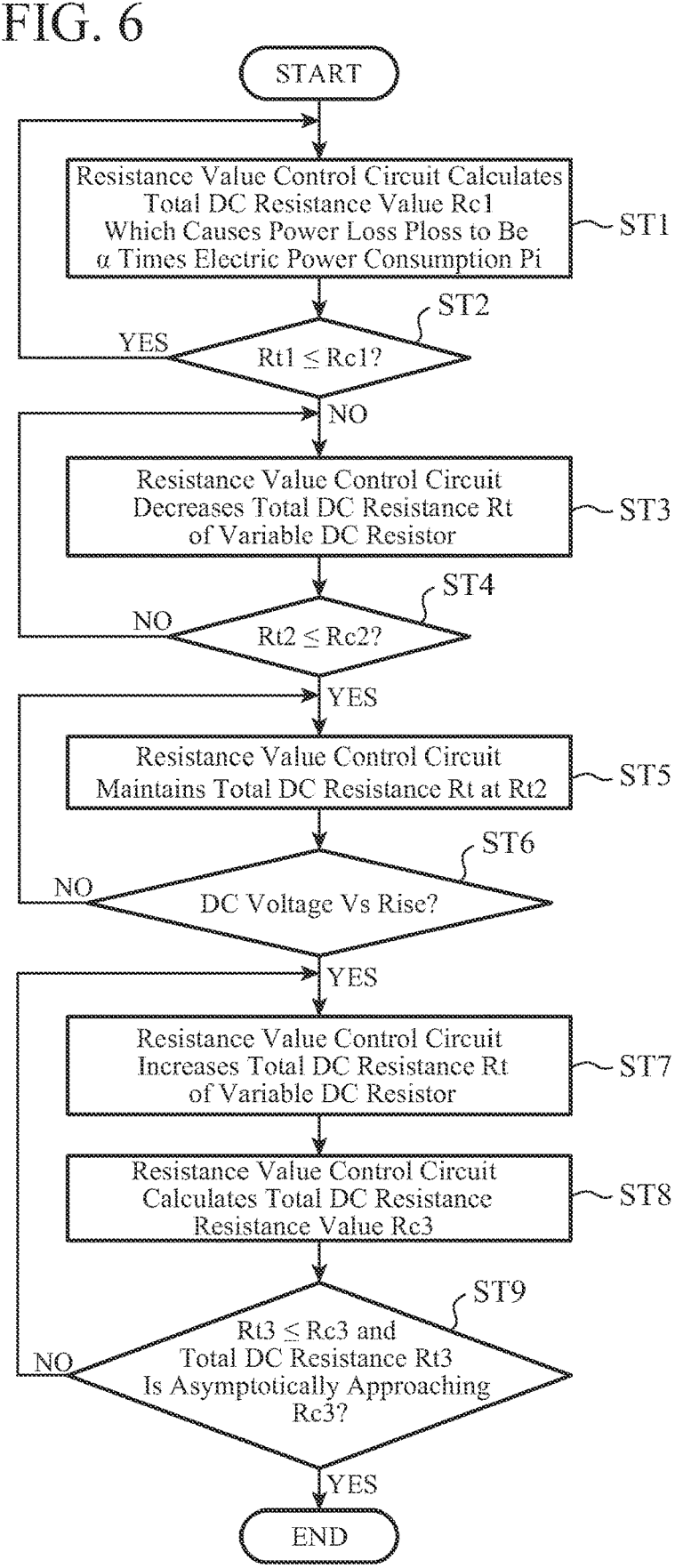
FIG. 6 is a flowchart showing the operation of the power supply device shown in FIG. 1.

FIG. 6 is a flowchart showing the operation of the power supply device shown in FIG. 1.

In FIG. 5, the initial DC voltage Vs is Vs1 and the initial direct current Ii is Ii1 when the practical use of the power supply device shown in FIG. 1 is started. Further, the initial total DC resistance Rt is Rt1.

Hereinafter, an example in which the DC voltage Vs rises from Vs2 to Vs3 after dropping from Vs1 to Vs2 will be explained. As can be seen from the equation (12), the DC resistance value Rc is a function of the DC voltage Vs, and when the DC voltage Vs drops from Vs1 to Vs2, the DC resistance value Rc corresponding to that drops from Rc1 to Rc2 and when the DC voltage Vs rises from Vs2 to Vs3, the DC resistance value Rc rises from Rc2 to Rc3.

The power calculation circuit 14 calculates the electric power consumption Pi of the DC to DC converter 3 by substituting each of the following: the initial DC voltage Vi1 and the initial direct current Ii1 into the equation (2). Here, it is assumed that the electric power consumption Pi is constant regardless of the DC voltage Vi.

The resistance value control circuit 15 calculates the total DC resistance value Rc1 of the filter circuit 12 which causes the power loss Ploss of the filter circuit 12 to be equal to α times the electric power consumption Pi, by substituting each of the following: the initial DC voltage Vs1 and the electric power consumption Pi into the equation (12) (step ST1 of FIG. 6). The example of FIG. 5 is described assuming that Rt1<Rc1 holds.

As shown in FIG. 5, in the case where the DC voltage Vs drops from Vs1 to Vs2 over a time period from a time t1 to a time t2, the direct current Ii increases.

The voltage measurement circuit 11 repeatedly measures the DC voltage Vs over the time period from the time t1 to the time t2.

The resistance value control circuit 15 repeatedly calculates the DC resistance value Rc over the time period from the time t1 to the time t2, by substituting each of the following: the DC voltage Vs and the above-mentioned electric power consumption Pi into the equation (12).

When Rt1≤Rc1 holds even though the DC voltage Vs drops from Vs1 to Vs2 (when Yes in step ST2 of FIG. 6), the processes of steps ST1 and ST2 are repeated.

When Rt1≤Rc1 does not hold (when No in step ST2 of FIG. 6), the resistance value control circuit 15 decreases the total DC resistance Rt of the filter circuit 12 over a time period from a time t3 to a time t4 by decreasing the resistance value Rv of the variable DC resistor 12*d* (step ST3 of FIG. 6). More specifically, the resistance value control circuit 15 decreases the total DC resistance Rt from Rt1 to Rt2.

The resistance value control circuit 15 acquires the DC voltage Vs from the voltage measurement circuit 11. The resistance value control circuit 15 then calculates the total DC resistance value Rc2 of the filter circuit 12 by substituting each of the following: the DC voltage Vs and the above-mentioned electric power consumption Pi into the equation (12).

When Rt2≤Rc2 does not hold (when No in step ST4 of FIG. 6), the resistance value control circuit 15 further decreases the total DC resistance Rt by further decreasing the resistance value Rv of the variable DC resistor 12*d* (step ST3 of FIG. 6).

When Rt2≤Rc2 holds (when Yes in step ST4 of FIG. 6), the resistance value control circuit 15 maintains the total DC resistance Rt at Rt2 (step ST5 of FIG. 6).

When the DC voltage Vs measured by the voltage measurement circuit 11 does not rise (when No in step ST6 of FIG. 6), the resistance value control circuit 15 continues the maintenance of the total DC resistance Rt (step ST5 of FIG. 6).

When the DC voltage Vs measured by the voltage measurement circuit 11 rises (when Yes in step ST6 of FIG. 6), the resistance value control circuit 15 increases the total DC resistance Rt over a time period from a time t7 to a time t8 by increasing the resistance value Rv of the variable DC resistor 12*d* (step ST7 of FIG. 6). More specifically, the resistance value control circuit 15 increases the total DC resistance Rt from Rt2 to Rt3. This is to increase current diversion to the inductor 12*a*, and to enhance the low pass filter function of the inductor 12*a*.

The resistance value control circuit 15 acquires the DC voltage Vs from the voltage measurement circuit 11. The resistance value control circuit 15 then calculates the total DC resistance value Rc3 of the filter circuit 12 by substituting each of the following: the DC voltage Vs and the above-mentioned electric power consumption Pi into the equation (12) (step ST8 of FIG. 6).

When the total DC resistance Rt3 is not asymptotic to the total DC resistance value Rc3 even though Rt3≤Rc3 holds (when No in step ST9 of FIG. 6), the resistance value control circuit 15 repeatedly performs the processes of steps ST7 and ST8.

When Rt3≤Rc3 holds and the total DC resistance Rt3 is asymptotic to the total DC resistance value Rc3 (when Yes in step ST9 of FIG. 6), the resistance value control circuit 15 ends the series of processes. Although the example of acquiring the DC voltage Vs is shown above, Vi instead of Vs may be acquired in each step in the case where Rt can be calculated from the value of Rv read from the table showing the correspondence between the on resistance Rv between the drain and the source and the voltage Vgs in a below-mentioned transistor, as can also be seen from the equation (12).

Figure 7:
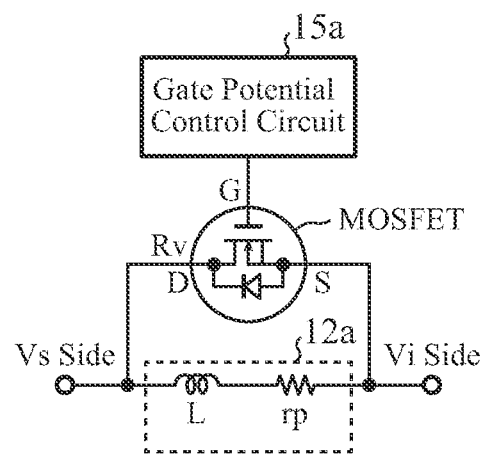
FIG. 7 is a schematic diagram showing a variable DC resistor 12d included in the filter circuit 12.

FIG. 7 is a schematic diagram showing the variable DC resistor 12*d* included in the filter circuit 12.

In the example of FIG. 7, a transistor Tr which is a discrete element is used as the variable DC resistor 12*d*. As the transistor Tr, an N-channel field effect transistor (referred to as "MOSFET" hereinafter) can be used, for example.

However, the transistor Tr is not limited to an N-channel MOSFET, and may be an insulated gate bipolar transistor (IGBT), for example.

The drain terminal D (first terminal) of the transistor Tr is connected to one end of the inductor 12a.

The source terminal S (second terminal) of the transistor Tr is connected to the other end of the inductor 12a.

The gate terminal G of the transistor Tr which is a control terminal is connected to a gate potential control circuit 15a included in the resistance value control circuit 15.

Figure 8:
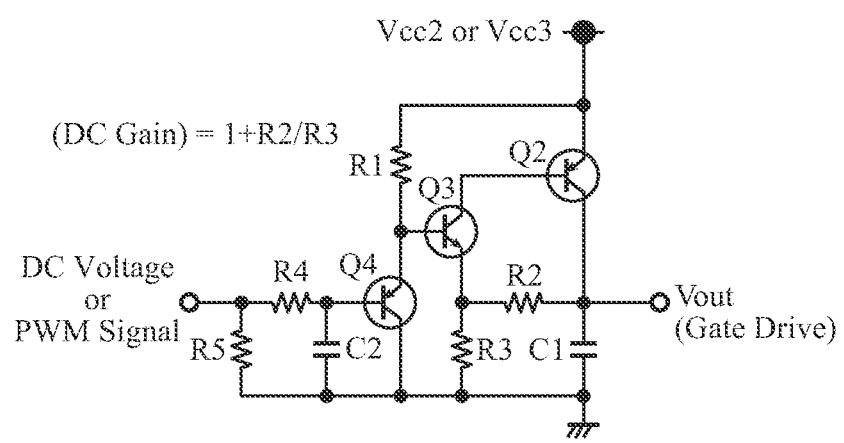
FIG. 8 is a schematic diagram showing a gate potential control circuit 15a included in a resistance value control circuit 15.

FIG. 8 is a schematic diagram showing the gate potential control circuit 15a included in the resistance value control circuit 15.

The gate potential control circuit 15a is implemented by a DC amplifier. The DC amplifier includes, for example, transistor elements Q2, Q3 and Q4, resistors R1, R2, R3, R4 and R5, and capacitors C1 and C2, as shown in FIG. 8.

The DC amplifier controls either a voltage applied to the gate terminal G of the transistor Tr or a current flowing through the gate terminal G of the transistor Tr on the basis of the electric power consumption Pi calculated by the power calculation circuit 14. In FIG. 8, Vout of the DC amplifier is connected to the gate terminal G of the transistor Tr.

Hereinafter, an operation of controlling the transistor Tr by the gate potential control circuit 15a will be explained.

The DC amplifier which is the gate potential control circuit 15a applies the voltage Vgs higher than the voltage which is the sum of the source voltage applied to the source terminal S of the transistor Tr and the threshold voltage of the transistor Tr between the gate and the source. When the voltage Vgs is applied between the gate and the source, electrical continuity is provided between the drain and the source of the transistor Tr.

Because the gate-source conductance in the transistor Tr is proportional to the voltage Vgs, Rv which is the drain-source on resistance is inversely proportional to the voltage Vgs. Rv which is the drain-source on resistance is the resistance value Rv of the variable DC resistor 12d.

For example, in case that the correspondence between the drain-source on resistance Rv and the voltage Vgs is tabulated, the gate potential control circuit 15a can, by referring to the table, determine the voltage Vgs corresponding to the on resistance Rv, which causes the power loss Ploss of the filter circuit 12 to be equal to or less than $\alpha$ times the electric power consumption Pi. The gate potential control circuit 15a applies the determined voltage Vgs between the gate and the source.

As the control voltage of the gate potential control circuit 15a, for example, either a DC voltage outputted from a digital-to-analog converter in a central processing unit (CPU), or the average of square-wave pulse voltages in a pulse width modulation (PWM) signal can be used. The gate potential control circuit 15a amplifies the control voltage by a factor of (1+R2/R3), the amplified control voltage falling within a range not exceeding a voltage Vcc applied from the outside, and applies the amplified control voltage to the gate terminal G of the transistor Tr.

Figure 9:
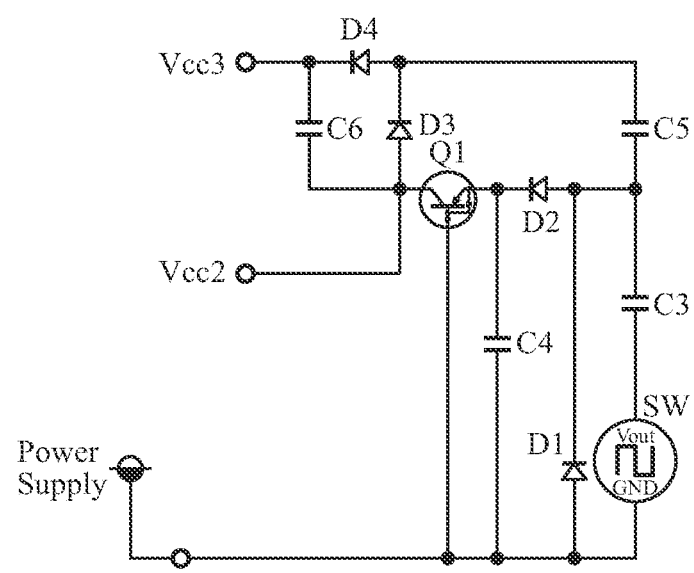

As a power supply that supplies the square-wave pulse voltages in the PWM signal to the gate potential control circuit 15a, a voltage rectifier circuit as shown in FIG. 9 can be used.

FIG. 9 is a schematic diagram showing a square-wave pulse rectifier circuit for supplying the DC voltage to the gate potential control circuit 15a.

The rectifier circuit shown in FIG. 9 includes a PNP transistor Q1, diodes D1, D2, D3 and D4, capacitors C3, C4, C5 and C6, and a square-wave pulse generation circuit SW.

The rectifier circuit shown in FIG. 9 rectifies each square-wave pulse voltage to a doubled voltage or a tripled voltage, and outputs either the doubled voltage or the tripled voltage, as the voltage Vcc to be supplied to the gate potential control circuit 15a, to the gate potential control circuit 15a.

In above-mentioned Embodiment 1, the filter device 2 includes the filter circuit 12 having the inductor 12a connected between the DC power supply 1 and the load, and the variable DC resistor 12d connected in parallel to the inductor 12a. The filter device 2 further includes the power calculation circuit 14 to acquire the voltage information showing the DC voltage outputted from the filter circuit 12 to the load, and the current information showing the direct current outputted from the filter circuit 12 to the load, and to calculate the electric power consumption of the load from the voltage information and the current information, and the resistance value control circuit 15 to control the resistance value of the variable DC resistor 12d on the basis of the electric power consumption calculated by the power calculation circuit 14 and the DC voltage. Therefore, the filter device 2 can reduce the power loss of the filter circuit 12 to $\alpha$ ($0<\alpha<1$) times the electric power consumption of the load or less.

More specifically, the filter device 2 connected to the load whose electric power consumption is constant regardless of its input voltage, like the DC to DC converter 3, monitors the DC voltage Vs applied to the filter circuit 12 and calculates the DC resistance value Rc which serves as the threshold of the total DC resistance Rt at which it is possible to maintain the loss in the filter circuit 12 at a value equal to or less than a certain percentage of the electric power consumption Pi, in order to make it possible to avoid an excessive power loss in the filter circuit 12 which occurs when the DC voltage Vs drops and which results from an increase in the load current consumption. In the filter device 2, the resistance value control circuit 15 that, when the DC voltage Vs decreases, can shunt the DC resistance component of the filter circuit 12 even while sacrificing, to some extent, the filter circuit 12's function of eliminating an alternating current noise is disposed. The filter device 2 can supply stable power to the DC to DC converter 3 by reducing the total DC resistance component of the inductor 12a and the variable DC resistor 12d to the DC resistance value Rc or less, can avoid an excessive Joulian heat loss in the filter circuit 12 by reducing the loss in the filter circuit 12 to the certain percentage of the electric power consumption Pi of the DC to DC converter 3 or less.

Embodiment 2

In Embodiment 2, a filter device 2 in which a filter circuit 12 has, in addition to an inductor 12a which is a first inductor, an inductor 12e which is a second inductor will be explained.

Figure 10:
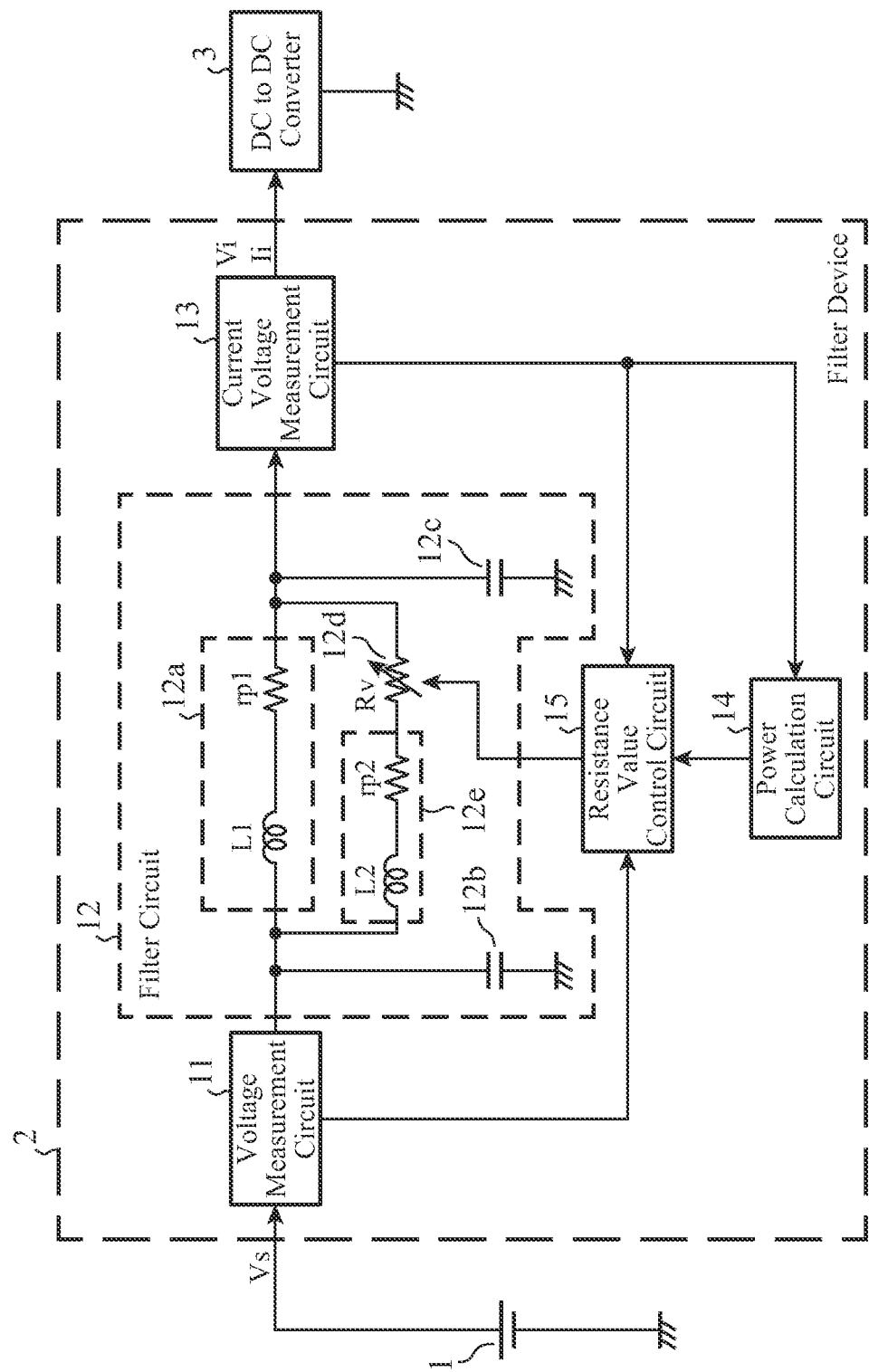
FIG. 10 is a schematic diagram showing a power supply device including a filter device 2 according to Embodiment 2.

FIG. 10 is a schematic diagram showing a power supply device including the filter device 2 according to Embodiment 2. In FIG. 10, because the same reference signs as those shown in FIG. 1 denote the same components or like components, an explanation of the components will be omitted hereinafter.

The filter circuit 12 has the inductor 12a, capacitors 12b and 12c, a variable DC resistor 12d and the inductor 12e.

In the power supply device shown in FIG. 10, a parasitic DC resistance rp which the inductor 12a which is the first inductor includes is a first parasitic DC resistance rp1.

The inductor 12e which is the second inductor is connected in series to the variable DC resistor 12d. A parasitic DC resistance which the inductor 12e includes is a second parasitic DC resistance rp2.

The DC resistance value of the second parasitic DC resistance rp2 is smaller than the DC resistance value of the first parasitic DC resistance rp1.

The inductance value L2 of the inductor 12e is smaller than the inductance value L1 of the inductor 12a.

Next, the operation of the power supply device shown in FIG. 10 will be explained.

The filter circuit 12 shown in FIG. 10 has, in addition to the inductor 12a, the inductor 12e. Therefore, the whole DC resistance of the filter circuit 12 shown in FIG. 10 is limited to equal to or greater than rp1×rp2/(rp1+rp2).

However, the function of the filter circuit 12 of FIG. 1 as a low pass filter (referred to as an "LPF" hereinafter) disappears because the inductance component of the inductor 12a is short-circuited when Rv is controlled so as to get close to zero in FIG. 1, while because in the filter circuit 12 of FIG. 2 the inductance value L2 of the inductor 12e remains even though Rv is brought close to zero, a certain degree of noise rejection performance can be ensured as an LPF in the filter circuit 12 shown in FIG. 10.

In order to cause the power loss Ploss of the filter circuit 12 to be less than α times electric power consumption Pi, a resistance value control circuit 15 controls the resistance value of the variable DC resistor 12d to cause the resistance value to be equal to or less than Rv expressed by the following equation (17). Rv expressed by the equation (17) is an upper limit of the resistance value of the variable DC resistor 12d which causes the power loss Ploss of the filter circuit 12 to be equal to α times the electric power consumption Pi. More specifically, a resistance value equal to or less than Rv expressed by the equation (17) serves as a threshold of the variable DC resistor 12d at which the power loss Ploss of the filter circuit 12 is caused to be equal to or less than α times the electric power consumption Pi.

$$Rv = \frac{Rp1 \times Rc}{Rp1 - Rc} - rp2 \quad (17)$$

Also in the filter device 2 shown in FIG. 10, the power loss of the filter circuit 12 can be reduced to α (0<α<1) times the electric power consumption of a load or less, like that of the filter device 2 shown in FIG. 1.

Embodiment 3

In Embodiment 3, a power supply device including an operating frequency control circuit 16 that controls the operating frequency of a DC to DC converter 3 will be explained.

Figure 11:
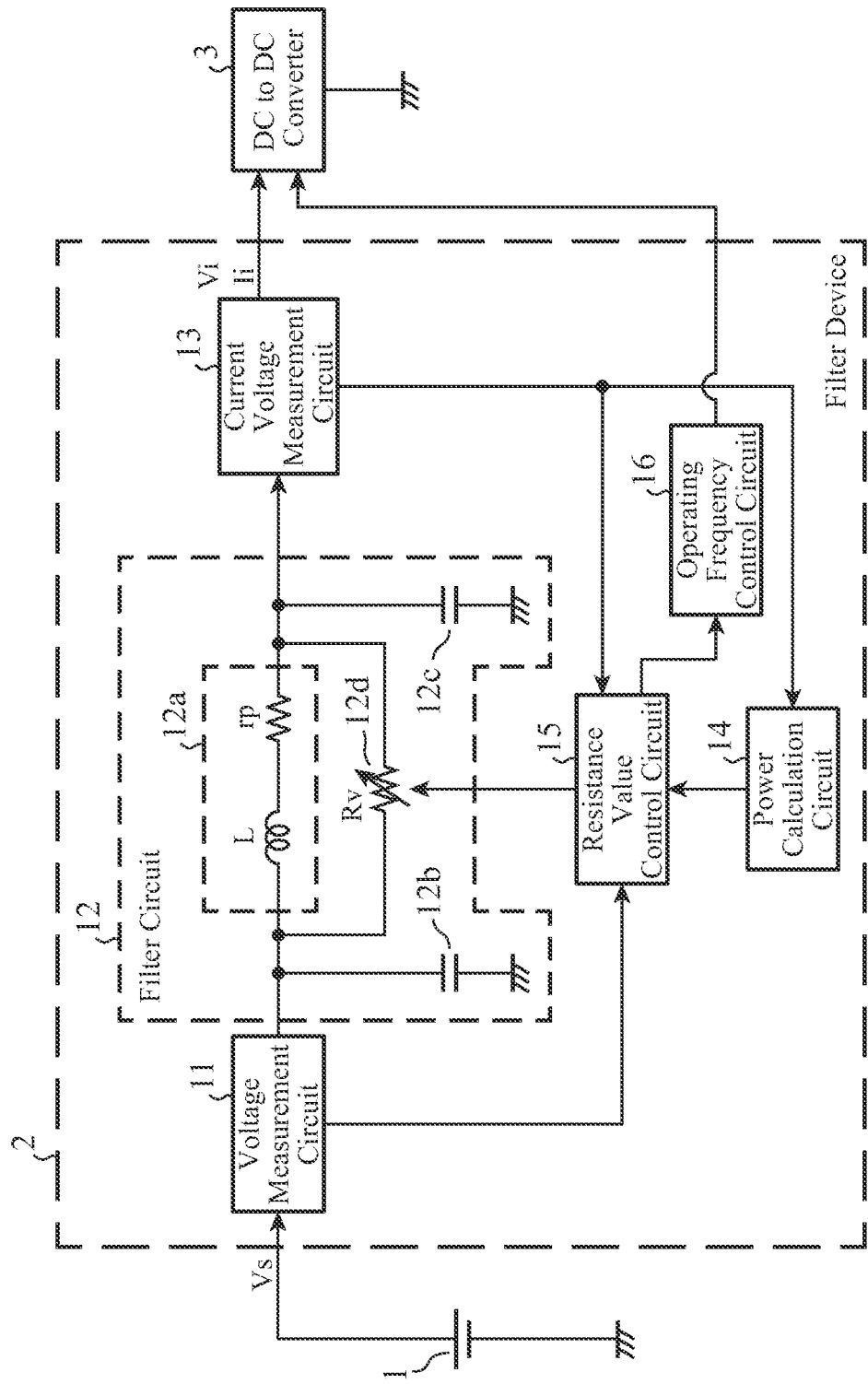
FIG. 11 is a schematic diagram showing a power supply device including a filter device 2 according to Embodiment 3.

FIG. 11 is a schematic diagram showing the power supply device including a filter device 2 according to Embodiment 3. In FIG. 11, because the same reference signs as those shown in FIGS. 1 and 10 denote the same components or like components, an explanation of the components will be omitted hereinafter.

When the resistance value of a variable DC resistor 12d is decreased by a resistance value control circuit 15, the operating frequency control circuit 16 increases the operating frequency of the DC to DC converter 3.

When the resistance value of the variable DC resistor 12d is increased by the resistance value control circuit 15, the operating frequency control circuit 16 decreases the operating frequency of the DC to DC converter 3.

The filter device 2 shown in FIG. 11 is the one in which the operating frequency control circuit 16 is applied to the filter device 2 shown in FIG. 1. However, this is only an example, and the operating frequency control circuit 16 may be applied to the filter device 2 shown in FIG. 10.

Figure 12:
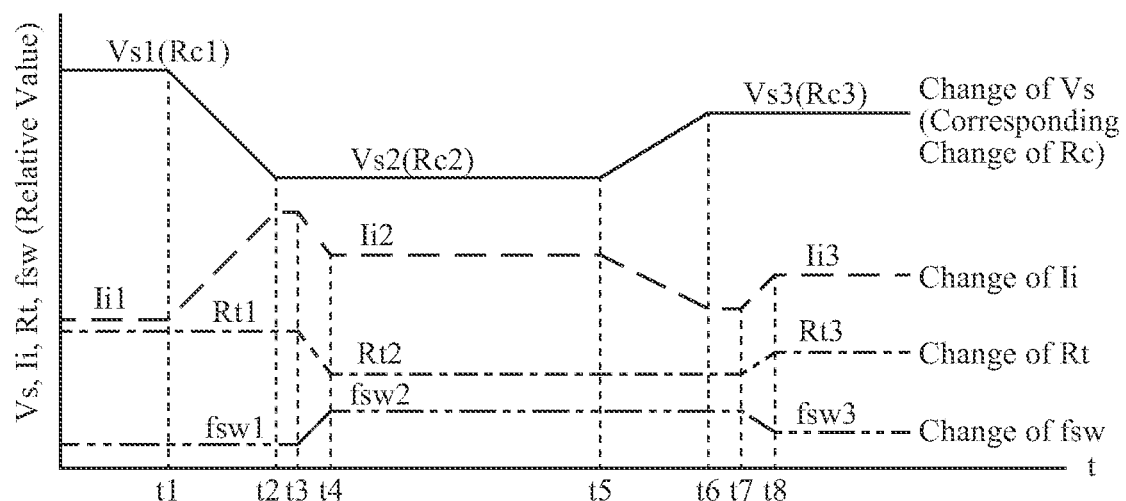
FIG. 12 is an explanatory drawing showing an example of a temporal change of each of the following: a DC voltage Vs, a direct current Ii, a total DC resistance Rt and the operating frequency fsw of a DC to DC converter 3.

FIG. 12 is an explanatory drawing showing an example of a temporal change of each of the following: a DC voltage Vs, a direct current Ii, a total DC resistance Rt and the operating frequency fsw of the DC to DC converter 3.

In FIG. 12, the horizontal axis shows a time, and the vertical axis shows each of the following: the DC voltage Vs, the direct current Ii, the total DC resistance Rt and the operating frequency fsw. Each of the following: the DC voltage Vs, the direct current Ii, the total DC resistance Rt and the operating frequency fsw in the vertical axis is a relative value.

Next, the operation of the power supply device shown in FIG. 11 will be explained. Because the power supply device is the same as the power supply device shown in FIG. 1 except for the operating frequency control circuit 16, only the operation of the operating frequency control circuit 16 will be explained hereinafter.

When the resistance value Rv of the variable DC resistor 12d is decreased by the resistance value control circuit 15, the operating frequency control circuit 16 increases the operating frequency fsw of the DC to DC converter 3, as shown in FIG. 12. As a result, the frequency of switching pulses in a switching element included in the DC to DC converter 3 increases. Therefore, because even though the effective inductance value of the filter circuit 12 becomes small and the cut-off frequency of the LPF increases, the frequency of a switching noise which should be eliminated also increases, a decrease in the effect of removing noises can be reduced.

On the other hand, because the effective inductance value of the filter circuit 12 becomes large and the cut-off frequency of the LPF decreases when the resistance value Rv of the variable DC resistor 12d is increased by the resistance value control circuit 15, the operating frequency control circuit 16 decreases the operating frequency fsw of the DC to DC converter 3, as shown in FIG. 12.

Embodiment 4

In Embodiment 4, a power supply device including an internal resistance value calculation circuit 17 and an electromotive force calculation circuit 18 will be explained.

Figure 13:
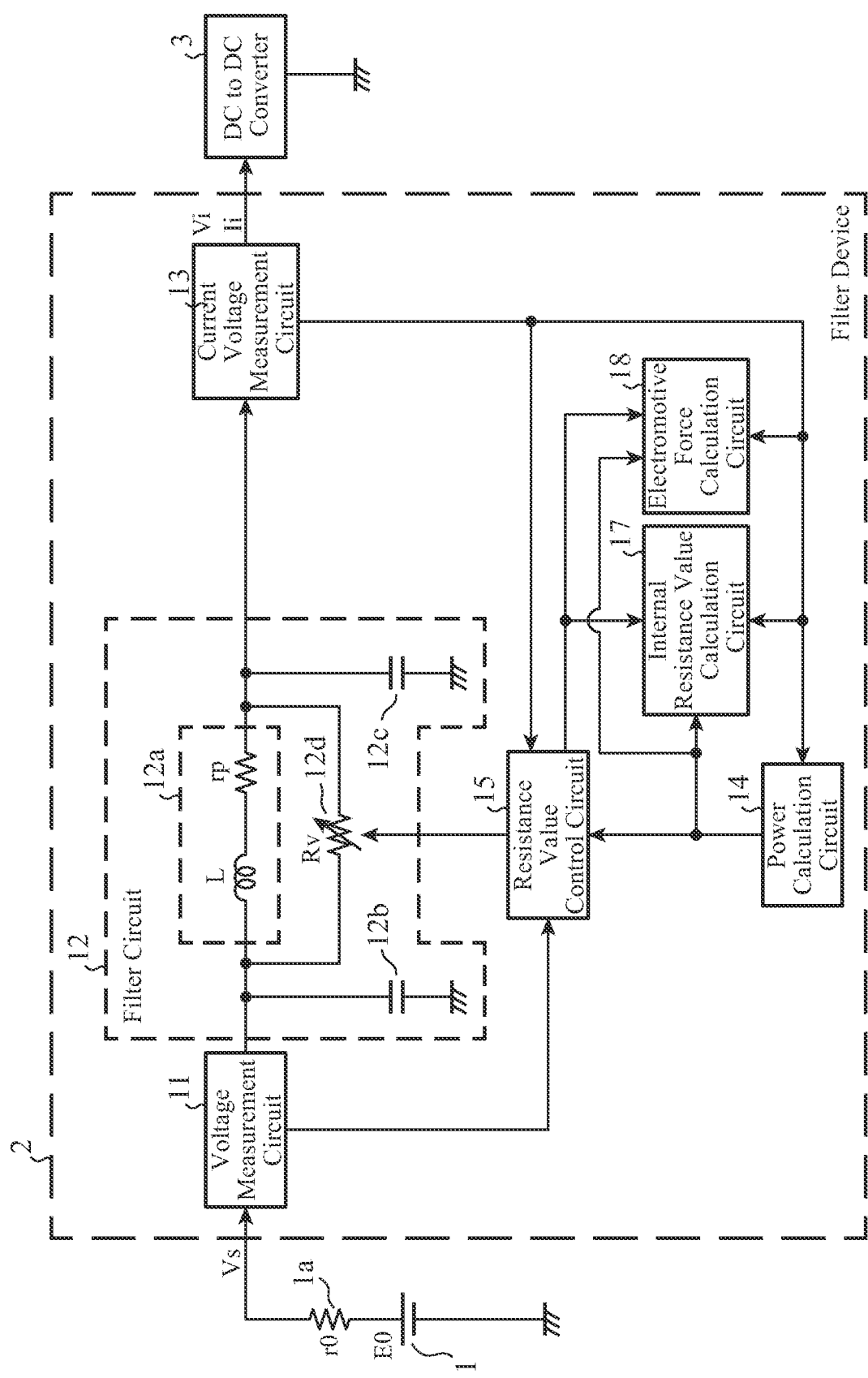
FIG. 13 is a schematic diagram showing a power supply device including a filter device 2 according to Embodiment 4.

FIG. 13 is a schematic diagram showing the power supply device including a filter device 2 according to Embodiment 4. In FIG. 13, because the same reference signs as those shown in FIGS. 1, 10 and 11 denote the same components or like components, an explanation of the components will be omitted hereinafter.

In the power supply device shown in FIG. 13, an internal resistance 1a is in a DC power supply 1.

The power supply device shown in FIG. 13 has a function of calculating the unknown resistance value r0 of the internal resistance 1a and the unknown electromotive force E0 of the DC power supply 1.

The internal resistance value calculation circuit 17 calculates the resistance value r0 of the internal resistance 1a on the basis of a first voltage Vi1, a second voltage Vi2, and electric power consumption Pi which is independent of the value of Vi.

The first voltage Vi1 is the DC voltage Vi outputted from a filter circuit 12 to a DC to DC converter 3 when the resistance value Rv of a variable DC resistor 12d is a first resistance value Rv1, and the internal resistance value calculation circuit 17 acquires voltage information showing the first voltage Vi1 and current information showing Ii1 from a current voltage measurement circuit 13, and calculates the electric power consumption Pi from the product of the first voltage Vi1 and Ii1.

The second voltage Vi2 is the DC voltage Vi outputted from the filter circuit 12 to the DC to DC converter 3 when the resistance value Rv of the variable DC resistor 12d is a second resistance value Rv2, and the internal resistance value calculation circuit 17 acquires voltage information showing the second voltage Vi2 from the current voltage measurement circuit 13.

The electromotive force calculation circuit 18 acquires the voltage information showing the first voltage Vi1, the current information showing Ii1 and the voltage information showing the second voltage Vi2 from the current voltage measurement circuit 13. The electric power consumption Pi is calculated from the product of Vi1 and Ii1.

The electromotive force calculation circuit 18 calculates the electromotive force E0 of the DC power supply 1 on the basis of the first voltage Vi1, the second voltage Vi2 and the electric power consumption Pi.

The filter device 2 shown in FIG. 13 is the one in which each of the following circuits: the internal resistance value calculation circuit 17 and the electromotive force calculation circuit 18 is applied to the filter device 2 shown in FIG. 1. However, this is only an example, and each of the following circuits: the internal resistance value calculation circuit 17 and the electromotive force calculation circuit 18 may be applied to either the filter device 2 shown in FIG. 10 or the filter device 2 shown in FIG. 11.

Next, the operation of the power supply device shown in FIG. 13 will be explained. Because the power supply device is the same as the power supply device shown in FIG. 1 except for the internal resistance value calculation circuit 17 and the electromotive force calculation circuit 18, only the operations of the internal resistance value calculation circuit 17 and the electromotive force calculation circuit 18 will be explained hereinafter.

r0 and E0 are calculated as mentioned above, and the same control as that in Embodiment 1 is performed. Rc is given by the following equation (18), and Rv is given by the following equation (20).

$$Rc = \frac{\alpha \times E0^2}{Pi \times (1+\alpha)^2} \tag{18}$$

$$r0 = \frac{Rv \times rp}{Rv + rp} = Rc \tag{19}$$

$$Rv = \frac{rp \times (Rc - r0)}{rp - (Rc - r0)} \tag{20}$$

Figure 14:
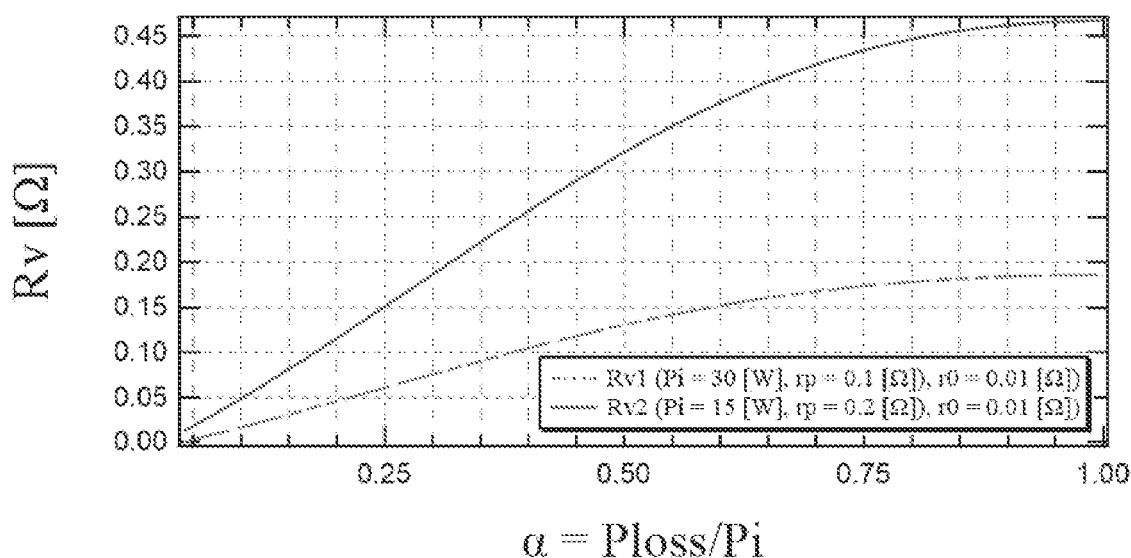
FIG. 14 is an explanatory drawing showing the correspondence between the ratio $\alpha$ of the electric power consumption Pi of a DC to DC converter 3 to the power loss Ploss of a filter circuit 12, and the resistance value Rv of a variable DC resistor 12d in the case where r0 is 0.01 [$\Omega$]

FIG. 14 is an explanatory drawing showing the correspondence between the ratio α of the electric power consumption Pi of the DC to DC converter 3 to the power loss Ploss of the filter circuit 12, and the resistance value Rv of the variable DC resistor 12d in the case where r0 is 0.01 [Ω].

In FIG. 14, the horizontal axis shows α, and the vertical axis shows the resistance value Rv [Ω] of the variable DC resistor 12d.

An alternate long and three short dashes line shows a relation between α and the resistance value Rv of the variable DC resistor 12d when the electric power consumption Pi is 30 [W] and a parasitic DC resistance rp is 0.1 [Ω].

A solid line shows a relation between α and the resistance value Rv of the variable DC resistor 12d when the electric power consumption Pi is 15 [W] and the parasitic DC resistance rp is 0.2 [Ω].

In the case where each of the following: the resistance value r0 of the internal resistance 1a and the electromotive force E0 of the DC power supply 1 is unknown, the resistance value control circuit 15 controls the resistance value Rv of the variable DC resistor 12d to cause the resistance value Rv of the variable DC resistor 12d to be equal to the first resistance value Rv1.

Each of the following circuits: the internal resistance value calculation circuit 17 and the electromotive force calculation circuit 18 acquires the voltage information showing the DC voltage Vi1 measured by the current voltage measurement circuit 13, the current information showing the direct current Ii1, a total DC resistance Rt1 of the filter circuit 12 which includes above-mentioned Rv1 and the parasitic DC resistance rp of the inductor 12a, and power information showing the electric power consumption Pi calculated by a power calculation circuit 14. It is assumed that the electric power consumption Pi has a constant value.

Next, the resistance value control circuit 15 controls the resistance value Rv of the variable DC resistor 12d to cause the resistance value Rv of the variable DC resistor 12d to be equal to the second resistance value Rv2.

Each of the following circuits: the internal resistance value calculation circuit 17 and the electromotive force calculation circuit 18 acquires the voltage information showing the DC voltage Vi2 measured by the current voltage measurement circuit 13, and the total DC resistance Rt2 of the filter circuit 12 which includes above-mentioned Rv2 and the parasitic DC resistance rp of the inductor 12a.

At this time, the following equation (21) holds.

$$E0 = Vi1 + \frac{(r0 + Rt1) \times Pi}{Vi1} = Vi2 + \frac{(r0 + Rt2) \times Pi}{Vi2} \tag{21}$$

When the equation (21) is solved for the resistance value r0 of the internal resistance 1a, the resistance value r0 is expressed as shown by the following equation (22). Further, when the equation (21) is solved for the electromotive force E0 of the DC power supply 1, the electromotive force E0 is expressed as shown by the following equation (23).

$$r0 = \frac{Vi1 \times Vi2}{Pi} + \frac{(Rt1 \times Vi2) - (Rt2 \times Vi1)}{Vi1 - Vi2} \tag{22}$$

$$E0 = Vi1 + Vi2 + \frac{Pi \times (Rt1 - Rt2)}{Vi1 - Vi2} \tag{23}$$

The internal resistance value calculation circuit 17 calculates the resistance value r0 of the internal resistance 1a by substituting the first voltage Vi1, the second voltage Vi2, the total DC resistances Rt1 and Rt2, and the electric power consumption Pi into the equation (22).

The electromotive force calculation circuit 18 calculates the electromotive force E0 of the DC power supply 1 by substituting the first voltage Vi1, the second voltage Vi2, the total DC resistances Rt1 and Rt2, and the electric power consumption Pi into the equation (23).

In above-mentioned Embodiment 4, the DC power supply 1 has the internal resistance 1a, and the power supply device includes the internal resistance value calculation circuit 17 that calculates the resistance value of the internal resistance 1a on the basis of the first voltage which is the DC voltage outputted from the filter circuit 12 to the DC to DC converter 3 when the resistance value of the variable DC resistor 12d is the first resistance value, and the second voltage which is the DC voltage outputted from the filter circuit 12 to the DC to DC converter 3 and the constant electric power consumption of the DC to DC converter 3 when the resistance value of the variable DC resistor 12d is the second resistance value. Therefore, the power supply device can reduce the power loss of the filter circuit 12 to α (0<α<1) times the electric power consumption of a load or less by performing the control by using r0, E0 and the equations (18) and (20).

Embodiment 5

In Embodiment 5, a power supply device in which when the efficiency of a DC to DC converter 3 varies depending on a voltage inputted to the DC to DC converter 3, a resistance value control circuit 19 calculates the resistance value Rv of a variable DC resistor 12d which causes a power loss of a filter circuit 12 to be equal to or less than α times electric power consumption will be explained.

Figure 15:
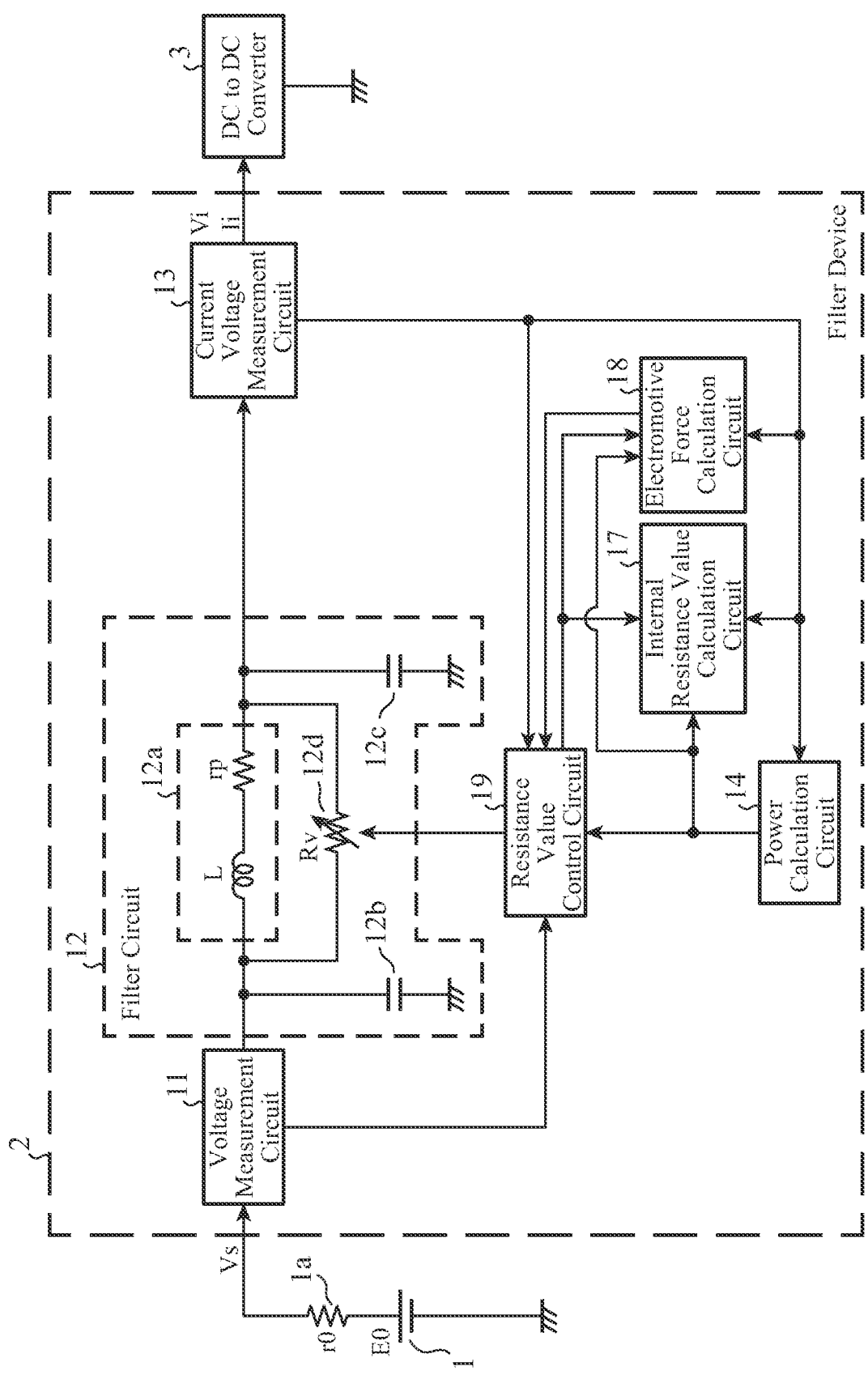
FIG. 15 is a schematic diagram showing a power supply device including a filter device 2 according to Embodiment 5.

FIG. 15 is a schematic diagram showing the power supply device including a filter device 2 according to Embodiment 5. In FIG. 15, because the same reference signs as those shown in FIGS. 1, 10, 11 and 13 denote the same components or like components, an explanation of the components will be omitted hereinafter.

Figure 16:
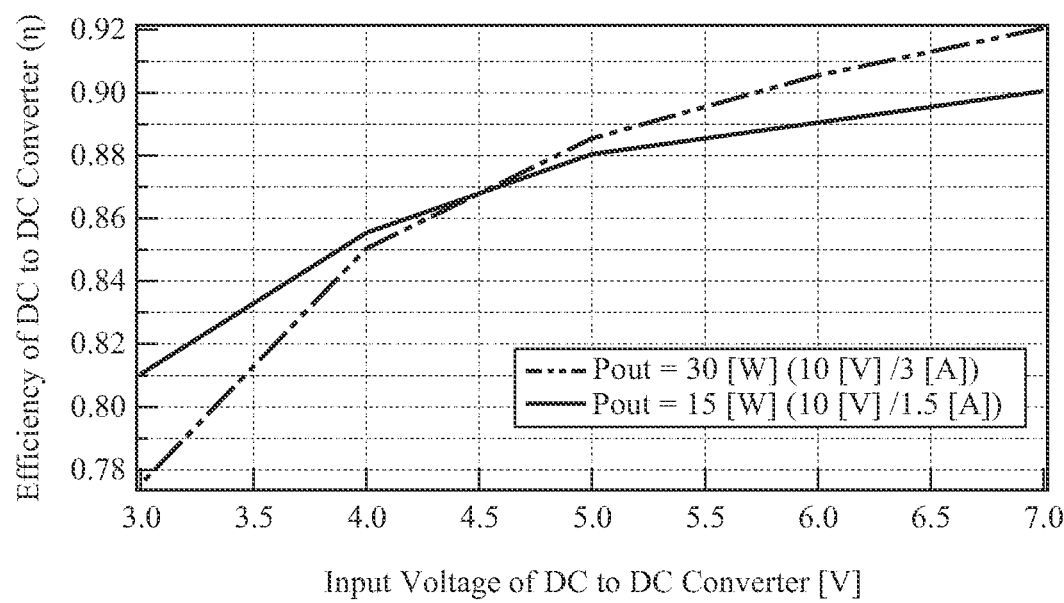
FIG. 16 is an explanatory drawing showing the dependence of the efficiency of a DC to DC boost converter on an input voltage.

In the power supply device shown in FIG. 15, it is assumed that the output power of the DC to DC converter 3 is constant, and the efficiency of the DC to DC converter 3 decreases with decrease in the input voltage of the DC to DC converter 3. As an example, an example of the dependence of the efficiency of a DC to DC boost converter on an input voltage is shown in FIG. 16. Further, it is assumed that the output power of the DC to DC converter 3 is known.

FIG. 16 is an explanatory drawing showing the dependence of the efficiency of the DC to DC boost converter on the input voltage. In FIG. 16, the horizontal axis shows the input voltage of the DC to DC converter 3, and the vertical axis shows the efficiency of the DC to DC converter 3. A solid line shows the efficiency η when the output power Pout of the DC to DC converter 3 is 15 [W], and an alternate long and two short dashes line shows the efficiency η when the output power Pout of the DC to DC converter 3 is 30 [W].

The resistance value control circuit 19 calculates the resistance value Rv of the variable DC resistor 12d which causes the power loss of the filter circuit 12 to be equal to or less than α times the electric power consumption, on the basis of the efficiency of the DC to DC converter 3 which corresponds to the input voltage of the DC to DC converter 3.

In the case of the DC to DC converter 3, the more the electric potential difference between the input voltage and the output voltage increases, the more the conversion efficiency worsens.

A worsening of the efficiency means an increase of the input power at the time of the reduced input voltage. If the output power of the DC to DC converter 3 has a constant value, the electric power consumption Pi of the DC to DC converter 3 increases by a value corresponding to the decrease in the efficiency.

Therefore, when calculating the total DC resistance value Rc of the parasitic DC resistance rp and the resistance value Rv, which causes the power loss Ploss of the filter circuit 12 to be equal to α times the electric power consumption Pi using the equation (12), the resistance value control circuit 19 needs to take into consideration that the electric power consumption Pi increases with decrease in a DC voltage Vi.

When the efficiency of the DC to DC converter 3 is denoted by η (<1) and the output power of the DC to DC converter 3 is denoted by Pout, the total DC resistance value Rc when the power loss Ploss is maintained at α times the electric power consumption Pi is expressed as shown by the following equation (24).

$$Rc = \frac{\alpha \times E0^2}{Pi \times (1+\alpha)^2} \qquad (24)$$
$$= \frac{\alpha \times \eta \times E0^2}{Pout \times (1+\alpha)^2}$$

A relation between the efficiency η of the DC to DC converter 3 and the DC voltage Vi is stored in an internal memory of the resistance value control circuit 19. It is assumed that the output power Pout is known and constant.

The resistance value control circuit 19 acquires the efficiency n corresponding to the DC voltage Vi from the internal memory. r0 and E0 are calculated from the equations (22) and (23) following the same procedure as that in Embodiment 4, and Rc is then calculated from the equation (24).

Next, the resistance value Rv of the variable DC resistor 12d which causes the power loss Ploss of the filter circuit 12 to be equal to or less than α times the electric power consumption Pi is calculated from the equation (20), and control of the variable DC resistor 12d is performed by the resistance value control circuit 19.

In above-mentioned Embodiment 5, the power supply device is configured in such a way that, when the output power of the DC to DC converter 3 is constant, and the efficiency decreases at the time of a decrease in the input power of the DC to DC converter 3, the resistance value control circuit 19 calculates the resistance value of the variable DC resistor 12d which causes the power loss of the filter circuit 12 to be equal to or less than α times the electric power consumption, on the basis of the efficiency of the DC to DC converter 3 which corresponds to the input voltage of the DC to DC converter 3. Therefore, the power supply device can reduce the power loss of the filter circuit 12 to α (0<α<1) times the input electric power consumption of the DC to DC converter 3 which is a load or less.

It is to be understood that an arbitrary combination of two or more of the above-mentioned embodiments can be made, various changes can be made in an arbitrary component according to any one of the above-mentioned embodiments, or an arbitrary component according to any one of the above-mentioned embodiments can be omitted within the scope of the present disclosure.

REFERENCE SIGNS LIST

1: DC power supply; 1a: Internal resistance; 2: Filter device; 3: DC to DC converter (Load); 11: Voltage measurement circuit; 12: Filter circuit; 12a: Inductor (First inductor); 12*b* and 12*c*: Capacitor; 12*d*: Variable DC resistor; 12*e*: Inductor (Second inductor); 13: Current voltage measurement circuit; 14: Power calculation circuit; 15: Resistance value control circuit; 15*a*: Gate potential control circuit; 16: Operating frequency control circuit; 17: Internal resistance value calculation circuit; 18: Electromotive force calculation circuit; and 19: Resistance value control circuit.

What is claimed is:

1. A filter device comprising:
a filter circuit having an inductor connected between a DC power supply and a load, and a variable DC resistor connected in parallel to the inductor;
a power calculation circuit to acquire voltage information showing a DC voltage outputted from the filter circuit to the load, and current information showing a direct current outputted from the filter circuit to the load, and to calculate electric power consumption of the load from the voltage information and the current information; and
a resistance value control circuit to control a resistance value of the variable DC resistor on a basis of the electric power consumption calculated by the power calculation circuit and the DC voltage.

2. The filter device according to claim 1, wherein
the resistance value control circuit controls the resistance value of the variable DC resistor to cause a power loss of the filter circuit to be equal to or less than $\alpha$ (0<$\alpha$<1) times the electric power consumption calculated by the power calculation circuit.

3. The filter device according to claim 2, further comprising a voltage measurement circuit to measure a DC voltage outputted from the DC power supply to the filter circuit, and a current voltage measurement circuit to measure each of the following: the DC voltage outputted from the filter circuit to the load, and the direct current outputted from the filter circuit to the load, wherein
the resistance value control circuit calculates an upper limit of the resistance value of the variable DC resistor, using the electric power consumption calculated by the power calculation circuit, the DC voltage measured by the voltage measurement circuit, and each of the following: the DC voltage and the direct current which are measured by the current voltage measurement circuit, and controls the resistance value of the variable DC resistor to cause the resistance value of the variable DC resistor to be equal to or less than the upper limit.

4. The filter device according to claim 2, further comprising a voltage measurement circuit to measure a DC voltage outputted from the DC power supply to the filter circuit, and a current voltage measurement circuit to measure each of the following: the DC voltage outputted from the filter circuit to the load, and the direct current outputted from the filter circuit to the load, wherein
the resistance value control circuit calculates a resistance value of the variable DC resistor which causes the power loss of the filter circuit to be equal to or less than $\alpha$ times the electric power consumption, using the electric power consumption calculated by the power calculation circuit, the DC voltage measured by the voltage measurement circuit, and each of the following: the DC voltage and the direct current which are measured by the current voltage measurement circuit.

5. The filter device according to claim 1, wherein
the inductor included in the filter circuit has a parasitic DC resistance.

6. The filter device according to claim 1, wherein
the inductor included in the filter circuit is a first inductor including a first parasitic DC resistance, the filter circuit further includes a second inductor connected in series to the variable DC resistor, the second inductor includes a second parasitic DC resistance having a DC resistance value smaller than a resistance value of the first parasitic DC resistance, and an inductance value of the second inductor is smaller than that of the first inductor.

7. The filter device according to claim 1, wherein
the variable DC resistor is equivalently composed of a transistor, a first terminal of the transistor is connected to one end of the inductor, a second terminal of the transistor is connected to the other end of the inductor, and a control terminal of the transistor is connected to the resistance value control circuit,
the resistance value control circuit controls the resistance value of the variable DC resistor by controlling either a voltage applied to the control terminal of the transistor or a current flowing through the control terminal of the transistor.

8. The filter device according to claim 7, wherein
the resistance value control circuit includes a DC amplifier,
the DC amplifier controls either the voltage applied to the control terminal of the transistor or the current flowing through the control terminal of the transistor on a basis of the electric power consumption calculated by the power calculation circuit and the voltage information showing the DC voltage outputted from the filter circuit to the load.

9. The filter device according to claim 8, wherein
the filter device comprises, as a power supply to supply a DC voltage to the DC amplifier, a rectifier circuit to rectify a square-wave pulse voltage to a doubled voltage or a tripled voltage.

10. A power supply device comprising:
the DC power supply;
a DC to DC converter which is the load; and
the filter device according to claim 1.

11. The power supply device according to claim 10, wherein
the power supply device comprises an operating frequency control circuit to increase an operating frequency of the DC to DC converter when the resistance value of the variable DC resistor is decreased by the resistance value control circuit, and to decrease the operating frequency of the DC to DC converter when the resistance value of the variable DC resistor is increased by the resistance value control circuit.

12. The power supply device according to claim 10, wherein
the DC power supply has an internal resistance,
the power supply device comprises an internal resistance value calculation circuit to calculate a resistance value of the internal resistance on a basis of a first voltage which is a DC voltage outputted from the filter circuit to the DC to DC converter when the resistance value of the variable DC resistor is a first resistance value, a second voltage which is the DC voltage outputted from the filter circuit to the DC to DC converter when the resistance value of the variable DC resistor is a second resistance value, and constant electric power consumption of the DC to DC converter.

13. The power supply device according to claim 10, wherein the power supply device comprises an electromotive force calculation circuit to calculate electromotive force of the DC power supply on a basis of a first voltage which is a DC voltage outputted from the filter circuit to the DC to DC converter when the resistance value of the variable DC resistor is a first resistance value, and a second voltage which is the DC voltage outputted from the filter circuit to the DC to DC converter when the resistance value of the variable DC resistor is a second resistance value and constant electric power consumption of the DC to DC converter.

14. The power supply device according to claim 10, wherein
when output power of the DC to DC converter is constant, and efficiency of the DC to DC converter decreases with decrease in input voltage of the DC to DC converter, the resistance value control circuit calculates a resistance value of the variable DC resistor which causes a power loss of the filter circuit to be equal to or less than $\alpha$ times the electric power consumption of the DC to DC converter, on a basis of the efficiency of the DC to DC converter which corresponds to a voltage inputted to the DC to DC converter.

15. A control device to control a filter circuit having an inductor connected between a DC power supply and a load, and a variable DC resistor connected in parallel to the inductor, the control device comprising:
a power calculation circuit to acquire voltage information showing a DC voltage outputted from the filter circuit to the load, and current information showing a direct current outputted from the filter circuit to the load, and to calculate electric power consumption of the load from the voltage information and the current information; and
a resistance value control circuit to control a resistance value of the variable DC resistor on a basis of the electric power consumption calculated by the power calculation circuit and the DC voltage.

* * * * *